US009878292B2

(12) United States Patent
Kitamura et al.

(10) Patent No.: US 9,878,292 B2
(45) Date of Patent: Jan. 30, 2018

(54) METHOD FOR MANUFACTURING SHEET-SHAPED SEPARATION MEMBRANE

(75) Inventors: Yoshihiro Kitamura, Ibaraki (JP); Ikuya Kuzuhara, Ibaraki (JP); Hiroshi Matsuo, Ibaraki (JP); Hirotoshi Ishizuka, Ibaraki (JP); Ken Nishiura, Ibaraki (JP); Yuu Takashima, Ibaraki (JP); Atsuhito Koumoto, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 137 days.

(21) Appl. No.: 13/883,115

(22) PCT Filed: Nov. 4, 2011

(86) PCT No.: PCT/JP2011/075476
§ 371 (c)(1),
(2), (4) Date: May 2, 2013

(87) PCT Pub. No.: WO2012/060447
PCT Pub. Date: May 10, 2012

(65) Prior Publication Data
US 2013/0224379 A1 Aug. 29, 2013

(30) Foreign Application Priority Data
Nov. 5, 2010 (JP) .................................. 2010-248835

(51) Int. Cl.
*B01D 67/00* (2006.01)
*B01D 71/34* (2006.01)
(Continued)

(52) U.S. Cl.
CPC ....... *B01D 67/0095* (2013.01); *B01D 65/102* (2013.01); *B01D 67/0013* (2013.01);
(Continued)

(58) Field of Classification Search
USPC ......................................................... 427/377
See application file for complete search history.

(56) References Cited

U.S. PATENT DOCUMENTS

| 3,516,883 A * | 6/1970 | Harper ........................... 156/77 |
| 3,729,536 A * | 4/1973 | Warwicker ..................... 264/41 |

(Continued)

FOREIGN PATENT DOCUMENTS

| CN | 101239280 | 6/2008 |
| EP | 0176992 A2 | 9/1985 |

(Continued)

OTHER PUBLICATIONS

First Office Action dated Jun. 26, 2014 in corresponding Chinese patent application No. 201180052901.X.
(Continued)

*Primary Examiner* — Nathan Empie
(74) *Attorney, Agent, or Firm* — Knobbe Martens Olson & Bear, LLP (57) ABSTRACT

Provided is a method for manufacturing a sheet-shaped separation membrane that allows a sheet-shaped separation membrane having uniform separating ability to be manufactured at a high speed, the method comprising manufacturing a sheet-shaped separation membrane by forming a microporous layer on a porous substrate, wherein the method is characterized in having: a membrane-forming solution application step of coating a porous substrate with a membrane-forming solution in which a polymer is dissolved in a solvent, a congealing liquid application step of applying a congealing liquid by a liquid membrane drop method to the porous substrate coated with the membrane-forming solution, and a solvent removal step of removing the solvent from the congealed microporous layer.

11 Claims, 4 Drawing Sheets

(51) Int. Cl.
  *B01D 71/68* (2006.01)
  *B01D 65/10* (2006.01)
(52) U.S. Cl.
  CPC ......... *B01D 67/0016* (2013.01); *B01D 71/34* (2013.01); *B01D 71/68* (2013.01); *B01D 2323/42* (2013.01)

(56) References Cited

U.S. PATENT DOCUMENTS

| | | | |
|---|---|---|---|
| 4,840,733 A | | 6/1989 | Sasaki et al. |
| 4,869,857 A | | 9/1989 | Itoh et al. |
| 4,970,034 A | * | 11/1990 | Ly .................... B01D 69/06 210/500.41 |
| 2003/0018094 A1 | | 1/2003 | Ohya et al. |
| 2006/0182893 A1 | * | 8/2006 | Fermin ................ B05C 5/005 427/420 |

FOREIGN PATENT DOCUMENTS

| | | |
|---|---|---|
| JP | 54-27029 | 3/1979 |
| JP | 61-086909 A | 5/1986 |
| JP | 63-141607 | 6/1988 |
| JP | 63-267406 | 11/1988 |
| JP | 04-18923 | 1/1992 |
| JP | 4-061922 | 2/1992 |
| JP | 10-328613 | 12/1998 |
| JP | 1998-328613 † | 12/1998 |
| JP | 2000-042385 | 2/2000 |
| JP | 2003-165128 | 6/2003 |
| JP | 2005-041956 | 2/2005 |
| JP | 2007-289937 † | 11/2007 |
| JP | 2007-289938 | 11/2007 |
| WO | WO2010/090087 A1 † | 8/2010 |
| WO | WO 2010/120056 | 10/2010 |
| WO | WO 10/090087 | 12/2010 |

OTHER PUBLICATIONS

Office Action dated Jun. 13, 2014 in corresponding Korean patent application No. 10-2013-7012618.
Submission of Information dated Nov. 21, 2013 in corresponding Japanese patent application No. 2011-242390.
Korean Notice of Final Rejection dated Dec. 23, 2014 in corresponding Korean Patent Application No. 10-2013-7012618.
International Search Report dated Jan. 24, 2012, received in PCT/JP2011/075476.
International Preliminary Report on Patentability dated May 16, 2013 in PCT/JP11/075476, translation of the Written Opinion of the International Searching Authority.
Chinese Office Action, dated Mar. 10, 2015, in corresponding Chinese Patent Application No. 201180052901.X.
Japanese Office Action dated, May 15, 2015, in corresponding to Japanese Patent Application No. 2011-242390.

* cited by examiner
† cited by third party

Fig. 1

Fig. 2 a) Example 1
(liquid membrane drop method)

b) Comparative example 2
(bottom-up method)

METHOD FOR MANUFACTURING SHEET-SHAPED SEPARATION MEMBRANE

This application is the U.S. National Phase under 35 U.S.C. § 371 of International Application No. PCT/JP2011/075476, filed Nov. 4, 2011, which claims priority to Japanese Patent Application No. 2010-248835, filed Nov. 5, 2010. The International Application was not published in English under PCT Article 21(2).

TECHNICAL FIELD

The present invention relates to a method for manufacturing a sheet-shaped separation membrane that is used as an ultrafiltration membrane, a microfiltration membrane, a support membrane of a reverse osmosis membrane, or the like.

BACKGROUND ART

Separation membranes such as ultrafiltration membranes and microfiltration membranes are used in various fields such as production of ultrapure water, purification, concentration, and sterilization in pharmaceutical and food industries, and processing of industrial waste water and daily-life waste water. These separation membranes include those of various shapes such as tubular shape, hollow thread shape, and sheet shape. Among these, a sheet-shaped separation membrane reinforced with a porous substrate such as woven cloth or nonwoven cloth has an advantage such that the membrane can be formed even when the strength of the membrane material itself is low.

For this reason, sheet-shaped separation membranes (porous separation membranes) using various membrane materials such as cellulose acetate, polysulfone, polyacrylonitrile, ethylene.vinyl alcohol copolymer, polyvinyl chloride, polyamide, polyimide, and polyvinylidene fluoride are manufactured and used in wide fields by being incorporated into modules of spiral type, plate and frame type, and rotary flat membrane type. Also, a reverse osmosis membrane having a porous separation membrane obtained in this manner as a support membrane is widely used.

A sheet-shaped separation membrane such as described above is manufactured generally by a method referred to as the wet congealing method (non-solvent induced phase separation method). Typically, by this method, a sheet-shaped separation membrane is formed by coating a porous substrate with a membrane-forming solution in which a predetermined polymer is dissolved in a solvent, allowing a micro phase separation to be generated on the liquid membrane surface by moisture in the atmosphere while evaporating the unnecessary solvent, and thereafter immersing into a congealing liquid (see, for example, the patent document 1) or applying a congealing liquid in contact (see, for example, the patent document 2 or 3) thereby to congeal the phase separation layer. Further, in manufacturing hollow thread membranes, the dry-wet type congealing method is known in which a drying step is provided before immersion into the congealing liquid after coating with the membrane-forming solution.

However, when a membrane is formed in a long period of time by such a method, change in the separation membrane ability and defect in the membrane surface are liable to occur with lapse of time by contact of the membrane-forming solution with the congealing liquid or, in the case of immersion, by rise in the solvent concentration or the polymer component concentration in the congealing liquid. In order to solve this problem, a measure such as performing frequent exchange of the congealing liquid or making the congealing liquid tank into a circulation bath has been conventionally tried. However, increase in the waste water processing costs, fluctuation, air bubbles, and concentration unevenness on the liquid surface in the congealing liquid tank, and others have been liable to give adverse effects on the separation membrane ability.

Also, with use of a method of applying the congealing liquid in contact by the bottom-up method or in the lateral direction, the contact with the congealing liquid is liable to be nonuniform depending on the condition of gravity or substrate membrane surface and, when an impurity is caught up, the influence thereof is liable to continue for a long period of time, so that, as a result, the separation membrane ability within the surface is liable to become nonuniform.

PRIOR ART DOCUMENTS

Patent Documents

Patent document 1: JP-A-2007-289938
Patent document 2: JP-A-2000-042385
Patent document 3: JP-A-04-018923

SUMMARY OF THE INVENTION

Problems to be Solved by the Invention

Thus, an object of the present invention is to provide a method for manufacturing a sheet-shaped separation membrane by which a separation membrane having an in-plane uniformity can be continuously manufactured and an inconvenience is hardly generated for a long period of time in manufacturing the sheet-shaped separation membrane by using the wet congealing method (non-solvent induced phase separation method) or the dry-wet type congealing method.

Means for Solving the Problems

The present inventors and others have repetitively made eager studies in order to solve the aforementioned problems and have found out that the aforementioned object can be achieved by a method of applying a congealing liquid by a liquid membrane drop method onto a porous substrate coated with a membrane-forming solution, thereby completing the present invention.

That is, the present invention relates to a method for manufacturing a sheet-shaped separation membrane in which a microporous layer is formed on a porous substrate, comprising:

a membrane-forming solution application step of coating a porous substrate with a membrane-forming solution in which a polymer is dissolved in a solvent;

a congealing liquid application step of applying a congealing liquid by a liquid membrane drop method to the porous substrate coated with the membrane-forming solution; and a solvent removal step of removing the solvent from the congealed microporous layer.

In the method for manufacturing a sheet-shaped separation membrane of the present invention, a liquid membrane drop method is adopted by which the congealing liquid can be brought into contact at a more uniform pressure with a porous substrate coated with a membrane-forming solution in a method for manufacturing an extremely delicate microporous membrane. The present inventors and others have found out that, by applying a congealing liquid using this liquid membrane drop method, the position at which the congealing liquid starts being in contact with the membrane-forming solution hardly fluctuates, and also the thickness of the congealing liquid membrane after the application becomes stable and uniform. As a result of this, it has been found out that congealing (phase separation) of the membrane-forming solution by the congealing liquid occurs uniformly, so that a sheet-shaped separation membrane having a uniform separation ability can be manufactured at a high speed.

It is preferable that the congealing liquid application step is a step in which the congealing liquid is dropped as a tilted part whose downstream side is lowered. It has been found out that, by this method, the congealing liquid becomes less liable to flow in a reverse direction to the backward side of transportation, whereby the position at which the congealing liquid starts being in contact with the membrane-forming solution becomes less liable to fluctuate, and a more uniform contact with the congealing liquid is enabled. For this reason, a sheet-shaped separation membrane having a more uniform separation ability can be obtained.

It is preferable that the tilted part is such that the porous substrate coated with the membrane-forming solution is supported by a support roll from a lower side. By this method, the porous substrate is brought into a state of being supported by a support roll, so that the fluctuation of the position at which the contact starts due to swaying of the porous substrate or the like as well as the thickness change of the congealing liquid membrane can be effectively suppressed.

It is preferable that further comprising a humidity adjustment step of bringing said membrane-forming solution into contact with a humidity adjustment atmosphere between said membrane-forming solution application step and said congealing liquid application step. Between the coating with the membrane-forming solution and the application of the congealing liquid, solvent evaporation, humidity absorption state, and the like are liable to be nonuniform, so that by carrying out a humidity adjustment step, the humidity absorption state can be made uniform, whereby a sheet-shaped separation membrane having a more uniform separation ability can be obtained. Also, there is a secondary effect such that the inside of the porous substrate is impregnated with the membrane-forming solution during the humidity adjustment step, thereby enhancing the strength of close adhesion to the porous substrate.

It is preferable that the humidity adjustment step is carried out by a counterflow method in which, while said porous substrate coated with the membrane-forming solution is being transported in a humidity adjustment space, a humidity adjustment atmosphere gas is let to flow in a reverse direction along a transportation direction thereof. By the counterflow method such as this, a turbulent flow is hardly generated at the interface between the membrane-forming solution and the humidity adjustment atmosphere gas, and the damage transmitted to the membrane surface by the gas flow becomes smaller, so that the humidity absorption state can be made more uniform, whereby a sheet-shaped separation membrane having a further more uniform separation ability can be obtained.

It is preferable that the membrane-forming solution contains polysulfone or polyvinylidene fluoride. By the manufacturing method of the present invention, congealing (phase separation) of the membrane-forming solution by the congealing liquid becomes more liable to occur uniformly, so that the method is particularly effective for polysulfone having a large congealing speed or hydrophobic polyvinylidene fluoride.

It is preferable that an application speed of applying the congealing liquid in said congealing liquid application step is 20 m/min or more. By a method of immersing into a congealing liquid or a method of allowing a congealing liquid to be adsorbed onto the membrane surface that have been conventionally carried out, it has been difficult to obtain a separation membrane having a high in-plane uniformity when the membrane-forming speed is raised. In contrast, by the manufacturing method of the present invention, congealing (phase separation) of the membrane-forming solution by the congealing liquid becomes more liable to occur uniformly, so that it will be easier to obtain a separation membrane having a high in-plane uniformity even when the membrane-forming speed is raised.

MODE FOR CARRYING OUT THE INVENTION

The method for manufacturing a sheet-shaped separation membrane according to the present invention is directed to manufacturing a sheet-shaped separation membrane in which a microporous layer is formed on a porous substrate. The sheet-shaped separation membrane can be used as a porous separation membrane such as an ultrafiltration membrane or a microfiltration membrane, a support membrane of a reverse osmosis membrane, or the like.

Figure 3:
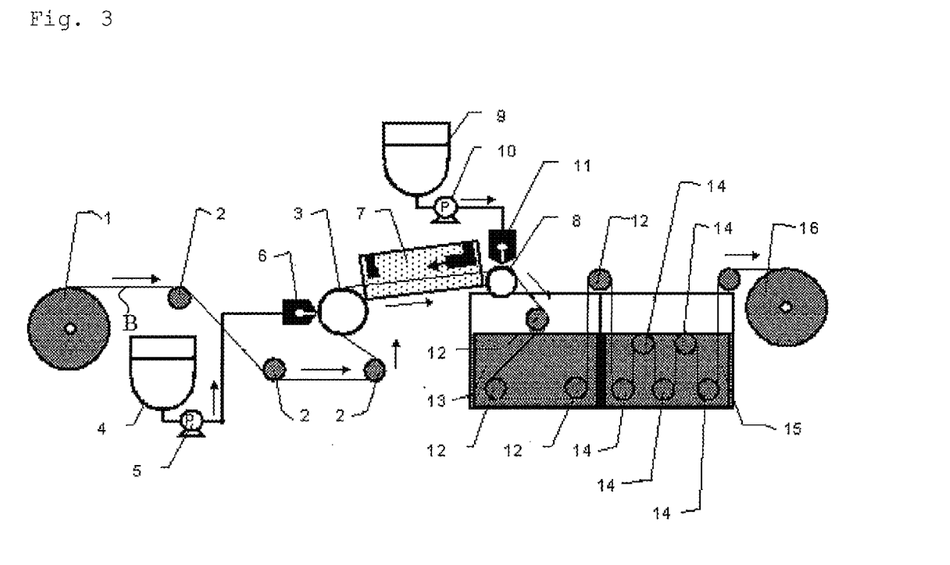
FIG. 3 is schematic model construction view showing one example of a manufacturing apparatus used in the method of manufacturing a sheet-shaped separation membrane of the present invention.

The manufacturing method of the present invention includes a membrane-forming solution application step, a congealing liquid application step, and a solvent removal step, and preferably includes a humidity adjustment step between the membrane-forming solution application step and the congealing liquid application step. The manufacturing method of the present invention can be carried out, for example, by using a manufacturing apparatus such as shown in FIG. 3. Hereafter, each step will be described.

The membrane-forming solution application step is a step of coating a porous substrate with a membrane-forming solution in which a polymer is dissolved in a solvent, and is preferably carried out by continuously transporting the porous substrate. By this step, a state is brought about in which the surface of the porous substrate is coated with the membrane-forming solution. From the viewpoint of enhancing the strength of the separation membrane, a state is preferably brought about in which the porous substrate is impregnated with a part of the membrane-forming solution.

When the apparatus shown in FIG. 3 is used, the porous substrate B that has been taken up in a roll form is paid out from a pay-out apparatus 1 and is transported to a back-up roller 3, at which the membrane-forming solution is applied, after passing through a plurality of guide rollers 2. In a membrane-forming solution tank 4, a membrane-forming solution in which a polymer and a solvent are dissolved at a predetermined concentration in advance is stored by being managed to be in a constant-temperature and atmosphere condition. The membrane-forming solution is supplied to a die-coater 6 by a liquid feeding pump 5 and is applied at a predetermined amount onto the transported porous substrate B during the transportation.

The method of applying the membrane-forming solution may be any method as long as the membrane-forming solution can be applied onto the porous substrate. However, a membrane-forming solution for wet-type membrane-forming in many cases is liable to be gellified by the influence of the atmosphere humidity, and in particular, a membrane-forming solution in which polysulfone is dissolved is extremely liable to be gellified (congealed), so that a coating method that gives less contact with air is preferable.

For this reason, in the membrane-forming solution application step, a die-coater such as a fountain coater, a lip coater, or a slot die-coater is particularly preferable; however, a bar coater such as a comma coater or a micro bar coater can be used as well.

The porous substrate (which may hereafter be abbreviated as "substrate") may be, for example, a woven cloth, a non-woven cloth, a mesh-shaped net, or the like made from a material such as polyester, polypropylene, polyethylene, polyamide, or polyphenylene sulfide (PPS). However, in view of membrane-forming property, chemical resistance, and cost performance, a non-woven cloth made of polyester or PPS is preferably used.

The membrane-forming solution can be prepared by dissolving a polymer for forming a separation membrane into one kind of a solvent, a mixture solvent of plural kinds of solvents having different dissolution properties, or a mixed liquid of a solvent and a non-solvent (including a poor solvent). In order to promote the dissolution, the dissolution of the polymer is preferably carried out after heating.

The kind of the polymer is not particularly limited and may be, for example, cellulose acetate, nitrocellulose, polysulfone, sulfonated polysulfone, polyethersulfone, polyacrylonitrile, polyvinyl alcohol, ethylene.vinyl alcohol copolymer, polyvinylidene fluoride, polycarbonate, polyamide, polyimide, or the like, and the polymer is selected in accordance with the usage of the sheet-shaped separation membrane. However, a polymer that is used particularly preferably in the present invention is a polymer having a high hydrophobicity, and may be, for example, polysulfone, polyvinylidene fluoride, or the like.

It is preferable to use, as the solvent, a solvent having compatibility with the congealing liquid although it depends on the kind of the polymer and the like. For example, as a solvent of polysulfone or polyvinylidene fluoride described above, a polar solvent such as N-methyl-2-pyrrolidone, dimethylformamide, dimethylacetamide, or dimethyl sulfoxide is preferably used, and also two or more kinds of these may be mixed for use.

As the non-solvent in the case of mixing a non-solvent, an aliphatic polyhydric alcohol such as ethylene glycol, diethylene glycol, propylene glycol, polyethylene glycol, or glycerin, a lower aliphatic alcohol such as methanol, ethanol, or isopropyl alcohol, a lower aliphatic ketone such as acetone or methyl ethyl ketone, or the like is preferably used.

The content of the non-solvent in the mixed solvent of the solvent and the non-solvent is not particularly limited as long as the obtained mixed solvent is uniform; however, the content is typically 5 to 50 wt % and is preferably 10 to 30 wt % in order to enhance the uniformity to a further extent.

In the membrane-forming solution, an additive referred to as a swelling agent or a pore-forming agent may be used in order to promote or control the forming of a porous structure. As such an additive, a metal salt such as lithium chloride, sodium chloride, or lithium nitrate, a water-soluble polymer such as polyethylene glycol, polyvinyl alcohol, polyvinylpyrrolidone, or polyacrylic acid or a metal salt thereof, formamide, or the like is used. The content of the swelling agent in the mixed solvent may be suitably set in accordance with the material and is not particularly limited as long as the membrane-forming solution is uniform; however, the content is typically 1 to 50 wt % and is preferably 2 to 30 wt %.

The polymer concentration is typically 10 to 30 wt % though depending on the kind of the polymer or the pore diameter to be formed. From the viewpoint of solubility and facility of application, the concentration is preferably 15 to 25 wt %. When the concentration exceeds 30 wt %, the water permeation property of the obtained porous separation membrane will be poor in practicability. On the other hand, when the concentration is less than 10 wt %, there is a fear such that a sufficient separation ability is not obtained, or the mechanical strength will be poor.

The speed of transporting the porous substrate (membrane-forming speed) is preferably as large as possible as long as an inconvenience is not generated in the productivity of the separation membrane and in the stability of forming the membrane. However, by the method of the present invention, the speed is preferably 20 m/min or more, particularly 20 to 200 m/min, and is more preferably 40 to 150 m/min, particularly 55 to 100 m/min. In the present invention, the effect of the present invention such that the separation ability of the separation membrane can be made uniform will be more conspicuous according as the transportation speed is higher. For example, in the case of forming a polysulfone-based sheet-shaped separation membrane, the period of time until the congealing starts after the porous substrate is brought into contact with the congealing liquid is as short as about 200 msec, and the present inventors and others have found out that the in-plane ability of the separation membrane changes in accordance with the condition of the moment at which the congealing liquid is brought into contact, so that this goal will be conspicuous particularly in forming the membrane at a high speed by which it is difficult to control the condition of the moment at which the congealing liquid is brought into contact.

The membrane-forming solution is not particularly limited as long as the membrane-forming solution is suitably selected in accordance with the concentration of the resin and the kind of the resin from the viewpoint of impregnation property and application property in the porous substrate; however, the viscosity is typically about 500 to 10000 mPa·s. At this time, when the viscosity is too low, the membrane surface is liable to be uneven, making it difficult to control. On the other hand, when the viscosity is too high, it will be difficult to form a membrane. Particularly by the method of the present invention, a uniform membrane surface is more likely to be obtained even when a membrane-forming solution having a low viscosity is used, so that the method can be suitably used even for a membrane-forming solution having a viscosity of 1000 mPa·s or less. Here, as the viscosity herein referred to, a numerical value at a shear speed of 100/s when measurement is made at a temperature of 30° C. at a shear speed of 0.1 to 14000/s using a Rheometer manufactured by Haake Co., Ltd. can be used.

The thickness (Wet application thickness) immediately after application of the membrane-forming solution is preferably about 0.05 to 1 mm, more preferably 0.1 to 0.5 mm, from the viewpoint of the separation ability of the separation membrane, the defect appearance ratio of the separation membrane, the source material cost, and the desolvation efficiency. This thickness may be determined by calculation using the concentration or the like of the membrane-forming solution; however, the thickness can be determined by the interference method or by laser measurement.

In the present invention, it is preferable that the method further includes a humidity adjustment step of bringing the membrane-forming solution into contact with a humidity adjustment atmosphere between the membrane-forming solution application step and the congealing liquid application step. By this step, the separation ability of the separation membrane can be made uniform, and the ability of the separation membrane can be controlled more easily.

When the apparatus shown in FIG. 3 is used, the substrate B coated with the membrane-forming solution is transported to the humidity adjustment step. The humidity adjustment step is carried out in a humidity adjustment space 7. The humidity adjustment space 7 has a structure such that an air-feeding inlet for supplying humidified air is disposed on the substrate B exit side, and an air-discharging outlet is disposed on the substrate B entrance side, whereby the humidified air flows in parallel to the substrate B.

Figure 7:
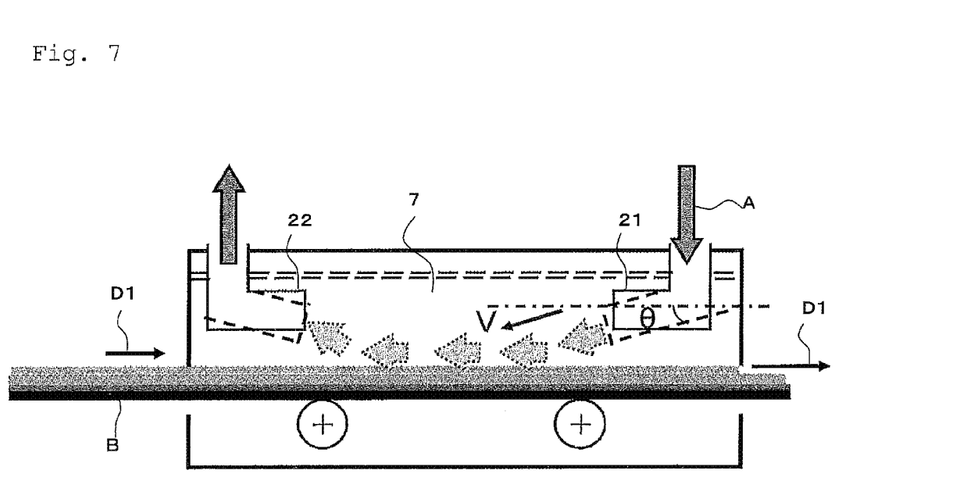
FIG. 7 is a schematic construction view showing an essential part of the manufacturing apparatus shown in FIG. 3.

The method of bringing the humidified air into contact with the membrane-forming surface is not particularly limited; however, the method is preferably a counterflow method by which, while transporting the porous substrate B coated with the membrane-forming solution in the humidity adjustment space 7, a humidity adjustment atmosphere gas A is let to flow in a reverse direction along the transportation direction D1 thereof, as shown in FIG. 7. As the humidity adjustment atmosphere gas A, humidified air, nitrogen gas, or the like can be used, for example.

In this counterflow method, the air-feeding inlet 21 is provided on the downstream side of the transportation direction D1 of the substrate B, and the angle θ of this air-feeding inlet 21 relative to the substrate surface is preferably adjusted to be 0 to 20°, more preferably 2 to 10°. Also, the air-discharging outlet 22 provided on the upstream side of the transportation direction D1 of the substrate B is preferably made to have an angle of the same degree. By this, a sheet-shaped separation membrane having a uniform and smooth separation membrane surface can be obtained.

Furthermore, in this counterflow method, the air speed V near the exit of the air-feeding inlet 21 of the humidified air is preferably set to be 1 to 7 m/s and, by this, a separation membrane having a good uniformity in the width direction can be obtained.

The absolute humidity in the humidity adjustment step is preferably managed to be 10 to 40 g/m$^3$, and a saturated humidity atmosphere is particularly preferable. By contact of water vapor with the membrane-forming solution applied to the substrate, the utmost surface layer part undergoes micro phase separation to form a dense layer, so that the separation ability can be controlled to a certain degree in advance.

The contact time of the membrane-forming solution and the humidity adjustment atmosphere (time of staying of the substrate) is preferably 0.1 to 1 sec, and the line length and the like of the apparatus is designed in accordance with the manufacturing speed so as to attain this contact time.

The congealing liquid application step is a step of applying a congealing liquid by a liquid membrane drop method to the porous substrate coated with the membrane-forming solution, and is preferably carried out while continuously transporting the porous substrate coated with the membrane-forming solution. By this step, the membrane-forming solution undergoes micro phase separation to form a microporous layer on the porous substrate.

Figure 4:
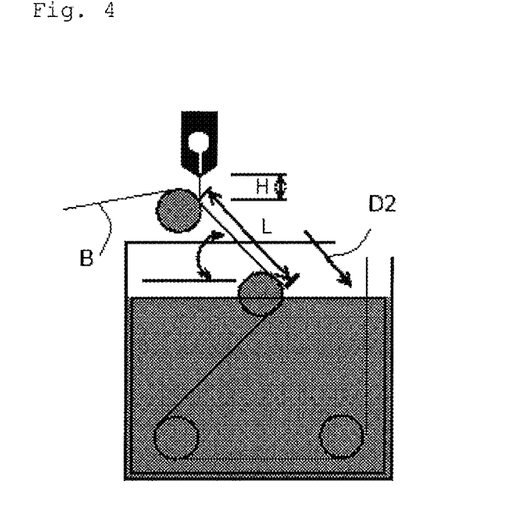
FIG. 4 is a schematic construction view showing an essential part of the manufacturing apparatus shown in FIG. 3.

When the apparatus shown in FIGS. 3 and 4 is used, the congealing liquid is obtained by mixing pure water and a solvent at a predetermined concentration and stored in a congealing liquid tank 9, where the congealing liquid is managed to have a constant temperature. This is supplied to the die-coater 11 by a liquid-feeding pump 10 for applying the congealing liquid by the liquid membrane drop method.

Immediately after passing through the humidity adjustment space 7, the porous substrate B coated with the membrane-forming solution is transported to a back-up roller 8 for application of the congealing liquid, whereafter the congealing liquid is applied by the die-coater 11 to cause micro phase separation down to the inside of the membrane-forming solution.

The apparatus that can be used for application by the liquid membrane drop method is not particularly limited as long as the apparatus is one such that the membrane-forming solution can be let to drop uniformly in a liquid membrane form (for example, a curtain coater), so that various fountain coaters and die-coaters can be exemplified. Among these, a slot die-coater, a curtain die-coater, a slide die-coater, and an extrusion die-coater can be used.

Here, as a method that is reverse to the liquid membrane drop method, there is a method of applying a congealing liquid by a bottom-up method using a slot die-coater or a fountain coater; however, there has been a problem such that a sufficient contact time cannot be gained or, even if the contact time is gained by the fountain coater or the like, a necessary and sufficient application thickness (1 mm or more in Wet thickness) cannot be ensured.

The back-up roller 8 for application of the congealing liquid described above may be contaminated with the membrane-forming solution that has been exuded down to the back surface of the non-woven cloth, so that the back-up roller 8 is preferably supported without being rotated. Further, a roller whose roll surface is coated with fluorine coating or with a fluorine tube for reducing the frictional resistance is preferable. Alternatively, a turn bar that transports the substrate B without contact by spraying air can be used as well.

Figure 5:
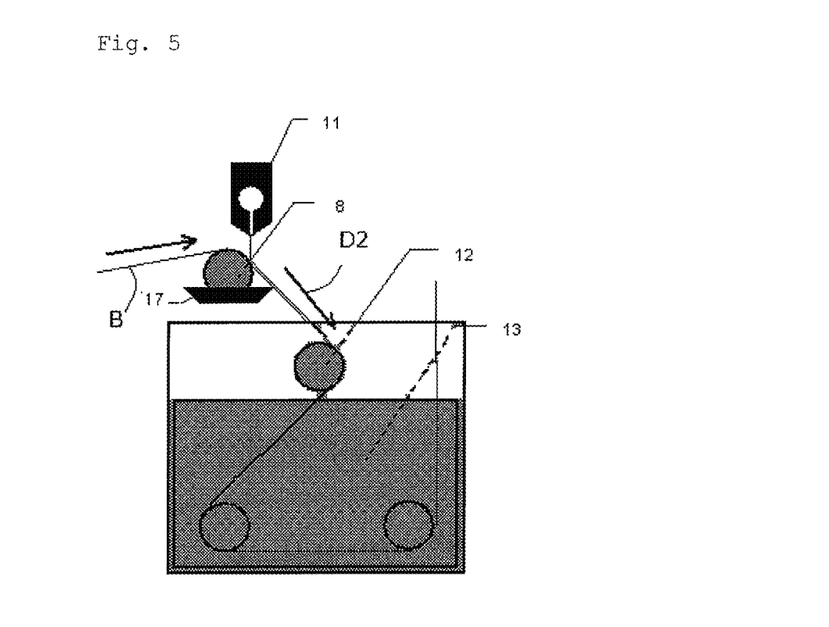
FIG. 5 is a schematic construction view showing another example of the essential part of the manufacturing apparatus shown in FIG. 3.

As a method of preventing the contamination of the back-up roller 8 described above, pure water may be applied to the back surface of the substrate B by providing a receiving pan 17 filled with pure water at the lower part of the back-up roller 8, as shown in FIG. 5.

The kind of the congealing liquid is one that will be a non-solvent of the polymer, and pure water may be mainly raised as an example. However, in order to control the speed of phase separation, the solvent of the membrane-forming solution may be mixed as well. For example, a 10 to 40 wt % aqueous solution of dimethylformamide can be applied as well. Also, for the purpose of lowering the surface tension, an alcohol-based solvent such as ethanol or isopropyl alcohol can be mixed as well.

The effect of the present invention is conspicuous particularly when a liquid having a low viscosity, for example, pure water, is used as the congealing liquid. A liquid having a comparatively low viscosity, such as an isopropyl alcohol solution, can be used as the congealing liquid as well. Further, since pure water has a high surface tension, repellence and defects are liable to be generated when the contact time is short, so that the effect of the present invention will be conspicuous.

Regarding the curtain die for application of the congealing liquid described above, the die opening thereof is preferably disposed at a position of height H of 2 to 200 mm from the upper surface (application surface) of the substrate B, and the height H is more preferably 5 to 50 mm. When this height is too low, defects are liable to be generated when a foreign substance is mingled. When the height is too high, it will be difficult to obtain a stable uniform surface. Also, the viscosity of the application surface at the time of application of the congealing liquid is about 700 mPa·s, and there are many cases of being in a soft state. When this height is too high, irregularity is liable to be generated.

It is known that the speed by which the congealing liquid dropping by the curtain die coater hits the substrate B is calculated by the following numerical formula 1. Here, Q represents the flow rate per unit width; Sh represents a gap between slots of the die; g represents a gravitational acceleration; and H represents the distance from the substrate B to the die. The hitting speed calculated by the present formula is 2.5 to 10 m/s. When the distance between the two is shorter than the above range, the curtain membrane cannot be formed. When the distance exceeds the above range, it may be considered that an unevenness is generated in the membrane-forming solution applied onto the substrate B, or the congealing liquid droplets that have been repelled at the upper surface of the substrate B adhere to the membrane-forming solution before congealing thereby to form spot-like defects.

In particular, since a polysulfone-based resin has a high congealing speed, irregularity in the addition of the congealing liquid is liable to lead to irregularity in congealing, so that the membrane surface is liable to become non-uniform. For this reason, the force (pressure, hitting speed, and the like) by which the congealing liquid is brought into contact with the application surface is preferably made constant.

[Numerical Formula 1]

$$V_c = Q/S_h + \sqrt{2gH}$$ (numerical formula 1)

In the present invention, due to the above-described reason, it is preferable that the congealing liquid application step is a step in which the congealing liquid is dropped uniformly to a tilted part whose downstream side is lowered, as shown in FIG. 4. At that time, it is more preferable that the tilted part is such that the porous substrate B coated with the membrane-forming solution is supported by a support roll from a lower side. Also, even when the congealing liquid is dropped to a position at which the substrate B is spaced apart from the support roll, it is preferable that the distance from the position of contact with the support roll is short.

Further, the substrate B coated with the congealing liquid is preferably transported by providing a tilt angle α so that the front side of the transportation direction D2 is lower, as shown in FIG. 4. Specifically, the tilt angle α relative to the horizontal direction is preferably 10 to 80°, more preferably 30 to 50°, and most preferably around 45°. By providing the tilt angle α, the applied congealing liquid forms a liquid membrane uniformly on the substrate B, and a uniform micro phase separation occurs from the surface to the inside, whereby a porous membrane having a more uniform separation ability is formed.

In the present invention, a flow may be generated at a part where the congealing liquid is applied, due to the balance among the supplying speed of the congealing liquid, the transportation speed of the substrate B, and the tilt angle α; however, under conditions such that the downward flow occurs to the part where the congealing liquid is applied, repellence of the congealing liquid is less liable to occur, and an effect of obtaining a more uniform separation ability is easily produced.

Also, from the viewpoint of reducing the influence caused by the concentration change of the congealing liquid in a later-mentioned congealing liquid immersion step, it is preferable to elongate the contact time in the congealing liquid application step. The contact time is preferably 0.1 to 3 seconds, more preferably 0.2 to 1.5 seconds, and still more preferably 0.5 to 1.2 seconds. The contact time is determined by the transportation speed of the substrate B and the transportation length L by which the tilt angle α is provided.

In the present invention, in order to attain the phase separation by the congealing liquid more completely, a congealing liquid immersion step of immersing the formed microporous layer into the congealing liquid may be provided after the congealing liquid application step.

When the apparatus shown in FIGS. 3 and 4 is used, the porous substrate B coated with the microporous layer is immersed by transportation into a congealing liquid tank 13 in which a congealing liquid is stored at a predetermined temperature, and is pulled up from the congealing liquid after passing through a plurality of rolls 12. The congealing liquid in the congealing liquid tank at this time may be different from the congealing liquid of the aforesaid liquid membrane drop method. For example, when the solvent used in the membrane-forming solution or a solvent having characteristics similar to those of this is dissolved at a low concentration in the congealing liquid of this congealing liquid tank, it is preferable because change in the formed state or the ability of the microporous layer accompanying the change of the condition of the contents of the congealing liquid with lapse of time can be suppressed. By this, a separation membrane having a constant level for a long period of time can be obtained.

The solvent removal step is a step of removing the solvent from the congealed microporous layer. By this step, the solvent is removed down to a predetermined solvent concentration from the microporous layer, and the fine polymer particles and the like adhering to the surface are removed. Also, the solvent removal step generates a meaning as a two-stage congealing method when a congealing liquid is used as a cleaning liquid.

The removal of the solvent may be carried out by immersion into a cleaning liquid; however, an apparatus of a suction roll type, a supersonic type, a spray-jetting type, or the like can be applied as well.

When the apparatus shown in FIG. 3 is used, the porous substrate B coated with the microporous layer and pulled up from the congealing liquid of the congealing liquid tank 13 is immersed by transportation into a cleaning liquid tank 15 in which a cleaning liquid is stored at a predetermined temperature, and is pulled up from the cleaning liquid after passing through a plurality of rolls 14, so as to be taken up by a take-up apparatus 16.

In the method of manufacturing a sheet-shaped separation membrane of the present invention, a drying step, a slitting step, a surface treatment step, and the like may be further carried out.

EXAMPLES

Hereafter, the present invention will be described by raising Examples; however, the present invention is by no means limited by these Examples. The characteristic values evaluated in the Examples and the Comparative Examples were measured by the following methods.

(1) Measurement of Bubble Point Pressure

Figure 6:
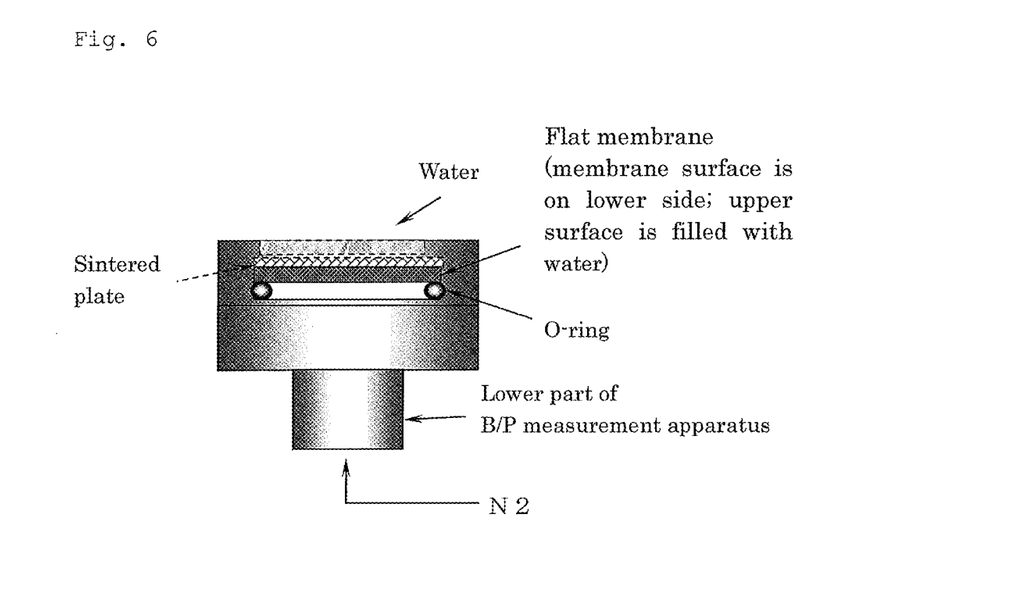
FIG. 6 is a schematic view of a bubble point tester used in the Examples.

The bubble point pressure is measured in accordance with JIS K3832 (ASTM F316-86). With respect to a separation membrane at an initial stage of forming the membrane, a circular sample having a diameter of 25 mm is stamped out from five points that are approximately equal in the width direction, and subsequently, for each of the aforesaid samples, the pressure (bubble point pressure) at which air bubbles are continuously generated on the surface of the water that fills the back surface side while gradually pressurizing a nitrogen gas from the separation membrane surface side is confirmed. An example of a test apparatus for this measurement is shown in FIG. 6. At this time, the applied maximum pressure was set to be 1 MPa, and the bubble point pressure in the case in which air bubbles were not generated at 1 MPa was denoted with ">1 [MPa]"

Here, by this method, presence or absence of defects in the flat membrane, that is, the presence of pores of micron order, can be confirmed and, assuming that the pores are tubular pores, the relationship between the bubble point pressure and the maximum pore diameter of the membrane is represented by the following formula.

$$P_{BP} \text{ (bubble point pressure [MPa])} = 4 \cdot \delta / d$$

($\delta$: surface tension of water $\approx 72 \times 10^{-3}$ [N/m], d: maximum pore diameter [μm])

At this time, for example, when the bubble point pressure is 1 MPa, the maximum pore diameter is about 0.3 μm.

(2) Evaluation of Membrane Surface Appearance

The appearance of the membrane surface after forming the membrane was observed by eye inspection, so as to evaluate the state of non-uniformity of the appearance deriving from repellence of the congealing liquid, the state of non-uniformity of the appearance deriving from non-uniform phase separation, and the like.

(3) Measurement of Polyethylene Glycol (PEG) Blocking Rate

From the obtained sheet-shaped separation membrane, samples collected at a diameter of 75 mm from three points (right side, center, left side) at positions approximately equal in the width direction were evaluated on ability under the following conditions by a circulation-type flat membrane test cell.

As the measurement condition, measurement was carried out at a pressure of 0.35 MPa and at a circulation flow rate of 10 L/min. using polyethylene glycol (first class grade reagent manufactured by Wako Pure Chemicals Co., Ltd., having an average molecular weight of 20,000 Da) with a stock liquid concentration of 0.5% and at a stock liquid temperature of 25° C. as a substance for evaluation.

As a method of calculation, the concentration of the stock liquid and the permeated liquid collected in the above ability evaluation was measured by a differential refractometer, so as to calculate the blocking rate by the following formula.

blocking rate (%)=[(stock liquid concentration−permeated liquid concentration)/stock liquid concentration]×100

Figure 1:
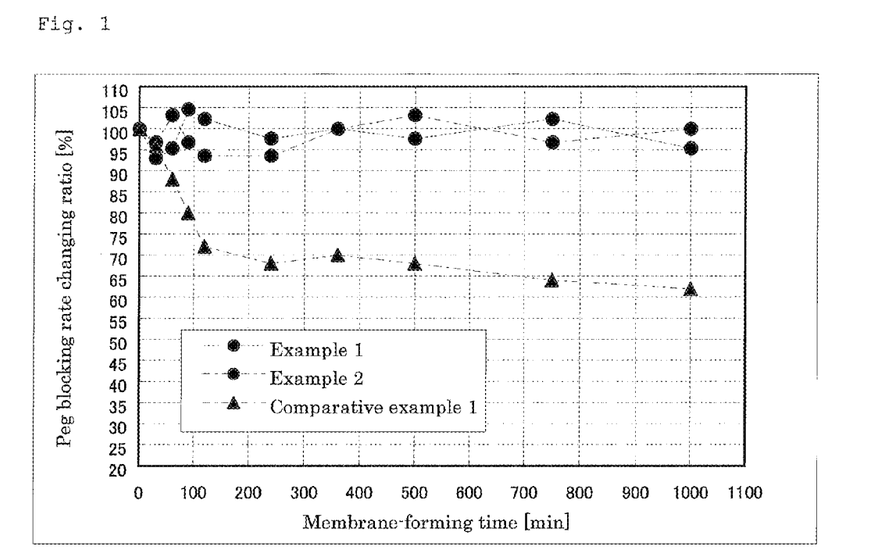
FIG. 1 is a graph showing results of Examples and a Comparative Example.

For this measurement, similar measurements were carried out on the separation membrane samples when the membrane was formed for 30, 60, 90, 120, 240, 360, 500, 750, and 1000 minutes assuming the time immediately after the start of membrane-forming to be a membrane-forming time of 0 minute. The changing ratio of each relative to the membrane-forming time of 0 minute (blocking rate of each membrane-forming time/blocking rate of the membrane-forming time of 0 minute×100 [%]) was determined, and the result thereof is shown as a graph. The results of the Examples 1 and 2 and the Comparative Example 1 are shown in FIG. 1.

Example 1

A membrane-forming solution was prepared by mixing 18.3 wt % of polysulfone (Udel P-3500 manufactured by Solvay Advanced Polymers Co., Ltd.) with 81.7 wt % of dimethylformamide, followed by dissolution at 100° C., filtration, and defoaming. While keeping this membrane-forming solution at about 25° C., the membrane-forming solution was applied onto a non-woven cloth (having a weight of 70 g/m², thickness of 90 μm, width of 280 mm) made of polyester, which constitutes a porous substrate, at a line speed of 60 m/min with a slot die-coater having an application width of 250 mm so as to attain a Wet application thickness of 130 μm.

Immediately after application of the membrane-forming solution, the porous substrate was passed in 0.5 second through a humidity adjustment step prepared to have an absolute humidity of 27 g/m³. Thereafter, pure water of 20° C. serving as a congealing liquid was applied at a flow rate of 12 L/min from a position of 15 mm from the upper surface of the application surface with a die-coater having an application width of 300 mm. The congealing liquid thickness at this time was about 0.5 mm.

Subsequently, after application of the congealing liquid, the porous substrate was transported to descend at a tilt angle of 45°, so as to form a congealing liquid membrane. Thereafter, the porous substrate was immersed into a 10% aqueous solution of DMF having a temperature of 20° C. after 0.2 second, and further immersed into a pure water tank having a temperature of 45° C. to remove the residual solvent in the membrane, whereafter the porous substrate was rolled up as a sheet-shaped separation membrane having a thickness of 130 μm.

Figure 2:
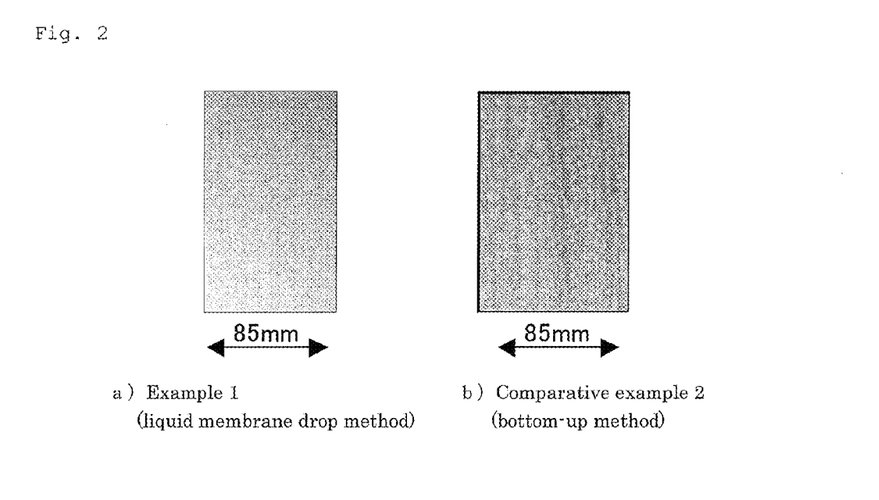
FIG. 2 is a photograph showing a surface of the separation membranes obtained in the Example and the Comparative Example.

The result of the above-described evaluation carried out on this sheet-shaped separation membrane is shown in Table 1, FIG. 1, and FIG. 2.

Example 2

A sheet-shaped separation membrane having a thickness of 130 μm was obtained in the same manner as in the Example 1 except that a 40% aqueous solution of DMF having a temperature of 30° C. was used as the congealing liquid in the Example 1. The result of the above-described evaluation carried out on this sheet-shaped separation membrane is shown in Table 1 and FIG. 1.

Example 3

A sheet-shaped separation membrane having a thickness of 130 μm was obtained in the same manner as in the Example 1 except that the tilt descent angle after the congealing liquid application was set to be 80° and the holding time was 0.3 sec in the Example 1. The result of the above-described evaluation carried out on this sheet-shaped separation membrane is shown in Table 1.

Example 4

A sheet-shaped separation membrane having a thickness of 130 μm was obtained in the same manner as in the Example 1 except that the line speed was set to be 30 m/min and the congealing liquid application thickness was 1 mm in the Example 1. The result of the above-described evaluation carried out on this sheet-shaped separation membrane is shown in Table 1.

Example 5

A sheet-shaped separation membrane having a thickness of 130 μm was obtained in the same manner as in the Example 1 except that the tilt descent angle immediately after the congealing liquid application was set to be 90° in the Example 1. The result of evaluation carried out on this sheet-shaped separation membrane is shown in Table 1.

Comparative Example 1

A sheet-shaped separation membrane having a thickness of 130 μm was obtained in the same manner as in the Example 1 except that the porous substrate was immersed into a tank filled with pure water of 20° C. as a method of congealing in the Example 1 instead of applying a congealing liquid by the liquid membrane drop method. The result of the above-described evaluation carried out on this sheet-shaped separation membrane is shown in Table 1 and FIG. 1.

Comparative Example 2

A sheet-shaped separation membrane having a thickness of 130 μm was obtained in the same manner as in the Example 1 except that the congealing liquid was applied from a lower side using a slot die-coater so as to attain a Wet thickness of about 0.5 mm as a congealing liquid application method in the Example 1. The result of the above-described evaluation carried out on this sheet-shaped separation membrane is shown in Table 1 and FIG. 2.

Comparative Example 3

A sheet-shaped separation membrane having a thickness of 130 μm was obtained in the same manner as in the Example 1 except that the porous substrate was tilted so as to descend at 90° after application of the membrane-forming solution and the congealing liquid similar to that of the Example 1 was applied in contact using a slot die-coater that was laterally oriented in the Example 1. The result of evaluation carried out on this sheet-shaped separation membrane is shown in Table 1.

The results of the in-plane uniformity of the sheet-shaped separation membranes obtained in the above and the evaluation of appearance by eye inspection, and the result of evaluation of the change in the PEG blocking rate with lapse of time are as shown in Table 1, FIG. 1, and FIG. 2.

TABLE 1

| | Congealing liquid | Congealing liquid application method | Tilt angle [degrees] after congealing liquid application | Line speed [m/s] | Bubble point [MPa] | | | | | Membrane surface appearance (eye inspection) | Changing ratio [%] in PEG blocking rate 6 hours after start of membrane-forming |
| --- | --- | --- | --- | --- | --- | --- | --- | --- | --- | --- | --- |
| | | | | | (1) | (2) | (3) | (4) | (5) | | |
| Example 1 | Pure water | Liquid membrane drop | 45 | 60 | >1 | >1 | >1 | >1 | >1 | ○ (good) | 100 |
| Example 2 | DMF aqueous solution | Liquid membrane drop | 45 | 60 | >1 | >1 | >1 | >1 | >1 | ○ (good) | 100 |
| Example 3 | Pure water | Liquid membrane drop | 80 | 60 | >1 | >1 | >1 | >1 | >1 | ○ (good) | — |
| Example 4 | Pure water | Liquid membrane drop | 45 | 30 | >1 | >1 | >1 | >1 | >1 | ○ (good) | — |
| Example 5 | Pure water | Liquid membrane drop | 90 | 60 | 0.5 | >1 | >1 | >1 | 0.6 | Δ (repellent on end part) | — |
| Comparative Example 1 | Pure water | Immersion | — | 60 | >1 | >1 | >1 | >1 | >1 | ○ (good) | 70 |
| Comparative Example 2 | Pure water | Bottom-up | — | 60 | 0.02 | 0.05 | 0.1 | 0.03 | 0.02 | X (repellent on whole surface) | — |
| Comparative Example 3 | Pure water | Laterally oriented contact application | 90 | 60 | 0.02 | 0.1 | 0.1 | 0.05 | 0.03 | X (repellent on whole surface) | — |

As a result of Table 1, the bubble point evaluation and the membrane surface uniformity by eye inspection of the appearance were good with respect to the Examples 1 to 5 and the Comparative Example 1. However, a little unevenness was seen at the end part in the Example 5 in which the tilt angle after application of the congealing liquid was 90 degrees (No problem is raised because the membrane can be used by cutting the end part off or the like.).

On the other hand, in the Comparative Example 2 in which the congealing liquid application method was a bottom-up method and in the Comparative Example 3 in which a laterally oriented slot die-coater was used, an unevenness that seemed to derive from repellence was seen on the whole surface, and also the numerical values of pressure were low over the whole surface in the bubble point evaluation, so that it will be understood that a sufficient microporous layer was not formed.

With respect to the change with time in the PEG blocking rate with lapse of time shown in FIG. 1, it will be understood that the decrease in the PEG blocking rate is large in the separation membrane of the Comparative Example 1 employing the immersion method, and the membrane ability becomes deteriorated in accordance with the membrane-forming time. On the other hand, with respect to the Examples 1 and 2, deterioration of the membrane ability in accordance with the membrane-forming time was little.

DESCRIPTION OF REFERENCE SIGNS 1 substrate pay-out apparatus
4 membrane-forming solution tank
6 die-coater
7 humidity adjustment space
9 congealing liquid tank
11 die-coater
15 cleaning tank
A humidity adjustment atmosphere gas
B substrate
D1 transportation direction (humidity adjustment step)
D2 transportation direction (congealing liquid application step)

The invention claimed is:

1. A method for manufacturing a sheet-shaped liquid water separation membrane in which a microporous layer is formed on a porous substrate, comprising:
 a membrane-forming solution application step of coating a porous substrate with a membrane-forming solution in which a polymer is dissolved in a solvent;
 a congealing liquid application step of dropping a congealing liquid evenly in the form of a liquid membrane by dropping the congealing liquid downward from above the porous substrate to an upper surface of the porous substrate coated with the membrane-forming solution; and
 a solvent removal step of removing the solvent from the congealed microporous layer,
 wherein said congealing liquid application step is a step in which the congealing liquid is dropped onto a downwardly tilted upper surface of the porous substrate,
 wherein the tilt angle of the tilted upper surface that is contacted by the congealing liquid relative to horizontal is 45 to 80 degrees,
 wherein the porous substrate is conveyed at a conveyance speed of at least 40 m/min, and
 wherein said membrane-forming solution contains polysulfone or polyvinylidene fluoride.

2. The method for manufacturing a sheet-shaped separation membrane according to claim 1, wherein said tilted part is such that the porous substrate coated with the membrane-forming solution is supported by a support roll from a lower side.

3. The method for manufacturing a sheet-shaped separation membrane according to claim 2, further comprising a humidity adjustment step of bringing said membrane-forming solution into contact with a humidity adjustment atmosphere between said membrane-forming solution application step and said congealing liquid application step.

4. The method for manufacturing a sheet-shaped separation membrane according to claim 3, wherein said humidity adjustment step is carried out by a counterflow method in which, while said porous substrate coated with the membrane-forming solution is being transported in a humidity adjustment space, a humidity adjustment atmosphere gas is let to flow in a reverse direction along a transportation direction thereof.

5. The method for manufacturing a sheet-shaped separation membrane according to claim 1, further comprising a humidity adjustment step of bringing said membrane-forming solution into contact with a humidity adjustment atmosphere between said membrane-forming solution application step and said congealing liquid application step.

6. The method for manufacturing a sheet-shaped separation membrane according to claim 5, wherein said humidity adjustment step is carried out by a counterflow method in which, while said porous substrate coated with the membrane-forming solution is being transported in a humidity adjustment space, a humidity adjustment atmosphere gas is let to flow in a reverse direction along a transportation direction thereof.

7. The method for manufacturing a sheet-shaped separation membrane according to claim 1, wherein an application speed of applying the congealing liquid in said congealing liquid application step is 20 m/min or more.

8. The method for manufacturing a sheet-shaped separation membrane according to claim 1, wherein said congealing liquid application step is a step in which the congealing liquid is dropped uniformly onto a downwardly tilted upper surface of the porous substrate.

9. The method for manufacturing a sheet-shaped separation membrane according to claim 1, wherein the membrane conveyance speed is at least 55 m/min.

10. The method for manufacturing a sheet-shaped separation membrane according to claim 1, wherein the membrane conveyance speed is 40 to 150 m/min.

11. The method for manufacturing a sheet-shaped separation membrane according to claim 1, wherein the membrane conveyance speed is 55 to 100 m/min.

* * * * *